United States Patent Office

3,008,842
Patented Nov. 14, 1961

3,008,842
BASIC REFRACTORY INSULATING SHAPES
Eldon D. Miller, Jr., Bethel Park, Pa., assignor to Harbison-Walker Refractories Company, Pittsburgh, Pa., a corporation of Pennsylvania
No Drawing. Filed May 2, 1960, Ser. No. 25,849
4 Claims. (Cl. 106—58)

This invention relates to refractory insulating shapes of basic compositions. More specifically, the invention is concerned with insulating shapes, such as brick, of basic composition that can be formed to the desired dimensions by compaction.

The use of refractory brick of basic compositions, for example, those predominantly composed of dead burned magnesite, mixtures of chrome ore and magnesite, and the like, has increased in recent years. The trend, particularly in the steel making industry, seems to indicate that the future will see much greater use for basic refractories in view of the higher operating temperatures involved in industrial processes. This has posed the problem of finding a back-up insulating material to reduce heat losses through these highly conductive refractories.

Moreover, the insulating material used must be compatible chemically with basic brick. The known refractory insulating brick made from fire clay and aluminous materials react with basic brick and cause melting at high temperatures. It is thus evident that but limited use could be made of such materials in providing insulating back-up shapes for basic refractories. The available magnesia block insulation (85 percent magnesia of commerce) composed of magnesium carbonate and asbestos has no utility for this purpose. It is chiefly useful at ordinary steam temperatures since it powders and falls apart at temperatures even under 500° F.

Considerable research has been conducted over the years in attempts to produce insulating fire brick of basic composition, particularly of dead burned dolomite and mixtures of chrome ore and dead burned magnesite, but without material success. Heat insulating brick differ from normal refractories in that they are far less dense and more porous so that the movement of heat through them is retarded. The porosity of common types of insulating brick is frequently derived from the use of natural cellular materials, such as diatomite or expanded vermiculite. However, those materials cannot be used in forming basic insulating compositions, and there are no comparable materials among the basic minerals.

Accordingly, other means of producing porosity have been sought. These have included the use of foams, the use of organic materials which burn out on firing, and materials which become porous through the loss of organic molecules. In all attempts of which I am aware, such expedients have repeatedly failed to result in satisfactory basic insulating refractories suitable for high temperature use, for example, above 2500° F. The practices necessary in using foams, i.e., whipping a detergent solution and mixing with slurries of fine ground chrome ore and dead burned magnesite and then adding accelerating agents to set the brick, have not yielded satisfactory products. One unattractive feature of such processes is that they do not yield a product in fired form with the precise dimensions required in furnace construction. In using organic burn-out materials, reducing conditions are encountered which destructively reduce such conventional basic aggregates as chrome ore and dead burned magnesite. Typical organic burn-out materials that have been tried include petroleum coke, rice hulls, cork, sawdust and the like.

Other methods that have been tried and discarded as failing to produce a satisfactory product, as measured by refractoriness, strength and density of the resulting articles, have included attempts to create porosity due to the loss of carbon dioxide during the heat-up of a shape containing crude magnesite. That is unsatisfactory due to the physical weakness of the product. Efforts to achieve the desired result have also involved casting or forming by the soft mud process. Mixtures containing organic matter can be readily moulded by the soft mud process, whereas the bubble method is best carried out by pouring the slip into moulds and waiting until the mass has set. The dry press method has not been used with any success with these materials. If they contain organic matter pressure cracking is a problem, and in the case of wet sawdust a large expansion after pressing occurs which weakens the brick. If the bubble process is used, the pressure squeezes the air out of the brick resulting in high density.

An actual practice in producing fired non-basic insulating refractories is accomplished by extruding a mix to billet shapes. The billets are then burned. After burning they are cut to the desired size. Experience shows that as much as 40 percent of the volume of each billet is lost during sizing. This practice is a necessity due to the high shrinkage of these insulating refractories made by this method during the firing process.

It is therefore an object of the present invention to provide fired basic insulating shapes, as well as compositions therefor, that are of low density and can withstand high temperatures, and which can be shaped to the desired final dimensions by conventional compaction techniques.

I have discovered that the object of the invention can be attained and basic insulating refractory shapes provided from a composition comprising, on a solids basis, 15 to 25 weight percent of expanded perlite and the remainder heavy refractory aggregate, at least 25 weight percent, and suitably at least 40 weight percent, of the total solids being dead burned magnesite. In addition, a bonding agent to provide strength in the green or unfired state can be included along with water for tempering and, if desired, a small addition of clay for workability. The resulting compositions can be formed to the desired shape by conventional compaction techniques. The firing of these shapes results in a basic product with a density below about 85 pounds per cubic foot, having a linear shrinkage below about 1.0 percent even after heating at 2910° F., having good strength, and that can withstand soaking temperatures as high as 3000° F. to 3100° F. Moreover, the resulting products are chemically compatible with other basic refractories and hence do not cause deleterious reactions to occur with furnace linings.

The aggregate content of compositions in accordance with my invention can consist entirely of dead burned magnesite. Alternatively, part of the dead burned magnesite can be replaced by other materials. The magnesite supplies free magnesia that reacts with the perlite to form forsterite, thereby providing a stabilized structure for the resulting shape. Some of the materials that can be substituted for part of the dead burned magnesite react with magnesia at approximately the same conditions at which perlite and dead burned magnesite react. Accordingly, such additives or substitutes for dead burned magnesite are used in limited quantities that permit sufficient magnesia to remain for substantially complete reaction with the perlite. Where no loss of magnesia occurs through reaction of an additive with the magnesia, a greater quantity of the dead burned magnesite can be substituted while meeting the requirement for forming the stabilized forsterite structure.

By way of example of the foregoing, olivine in amounts up to about 40 weight percent of the total aggregate can be used in conjunction with the magnesite. Similarly, up to 25 percent of the total aggregate can be chrome ore. Still further, alumina in amounts up to 20 weight percent can be substituted for part of the dead burned magnesite. Moreover, ternary mixtures such as up to 20 percent of alumina, up to 40 percent of olivine and the remainder dead burned magnesite have been used with success. For some purposes, such as providing workability of the batch and enhancing the green strength, a small amount of a material such as ball clay can be used. Where clay, such as ball clay, is used for those purposes, it generally is provided in an amount up to about 5 weight percent based on the solids content of the batch. However, ball clay can also be used in limited amounts as a substitute for part of the magnesite. For example, mixtures of dead burned magnesite and ball clay, where the latter comprises up to about 25 weight percent of the total aggregate, have been used with success. Dead burned magnesite, especially that prepared from sea water, constitutes the preferred aggregate for it provides a higher refractoriness than can be obtained with any of the mixtures indicated or with that obtained with natural dead burned magnesites. Typical analyses of dead burned natural and sea water magnesites are:

Nevada magnesite:

| | Percent |
|---|---|
| $MgO$ | 85.7 |
| $CaO$ | 5.09 |
| $SiO_2$ | 4.34 |
| $Fe_2O_3$ | 4.05 |
| $Al_2O_3$ | 0.79 |

Sea water magnesite:

| | |
|---|---|
| $MgO$ | 95.1 |
| $CaO$ | 1.3 |
| $SiO_2$ | 2.7 |
| $Fe_2O_3$ | 0.6 |
| $Al_2O_3$ | 0.3 |

The particle size of the dead burned magnesite content of the heavy aggregate used in the invention should be quite fine, substantially all passing a 65 mesh Tyler screen. The other heavy aggregate usually is at least as fine as minus 28 mesh and can pass a 325 mesh screen as when fine-ground alumina or air-floated ball clay is used. The magnesite must be fine to be sufficiently reactive with perlite during firing. It is known that the magnesite reacts with the perlite melt formed when the material is heated, forming forsterite and spinel. Thus, the perlite is retained within the resulting refractory structure by combining with or being absorbed into the magnesia, thereby resulting in a large volume of voids. The reactivity requirement between the perlite and magnesite place a practical limit on the type and quantity of aggregate that can be substituted for part of the magnesite, for sufficient magnesia must remain available to react with the silica content of the perlite to form forsterite.

Expanded perlite constitutes the lightweight component in compositions within my invention. Expanded perlite is a lightweight, easily crushed, globular, glassy particle which is predominantly alumina and silica with some alkalies. Expanded perlite softens and melts at temperatures below about 2000° F. but compositions of my invention are designed to take advantage of this fact. It is thought that the perlite is retained within the resulting refractory structure by combining with or being absorbed into the more refractory constituents of the batch, i.e., the magnesite. It has been found that the perlite combines with the magnesite forming forsterite, magnesium orthosilicate. A typical perlite composition is, in weight percent, as follows:

| | Percent |
|---|---|
| $SiO_2$ | 70 |
| $Al_2O_3$ | 15 |
| $Fe_2O_3$ | 2 |
| $MgO$ | 1 |
| $CaO$ | 1 |
| Alkalies | 7 |
| Ignition loss | 4 |

The size of the expanded perlite particles is not critical, but I have found that material substantially all of which passes a 6 mesh Tyler screen and not more than 10 percent of which passes a 100 mesh Tyler screen gives a very satisfactory product.

The invention will be described further in conjunction with the following specific examples. It should be understood that the details are given by way of illustration and not by way of limitation.

In the manufacture of insulating shapes, such as brick, in accordance with my invention, expanded perlite is charged to a mixer and sprayed with water. The mixer needs to be of a type which will cause only a minimum breakdown of the fragile perlite particles. I have found a tumbling type mixer to be ideal. A bonding agent, such as waste sulfite liquor, epsom salts, nitre cake, magnesium chloride, or similar material, is added to the tempered perlite. Generally, the bonding agent is used in an amount equal to about 5 percent of the total weight of the solids of the resulting batch. The bonding agent may be thought as being temporary in nature to provide the brick with strength until the permanent ceramic bond is developed through firing. About 5 percent of water, based on the total solids, is used. After all the liquid has been added the batch is mixed for a few minutes. Then the aggregate components, such as dead burned magnesite and clay, after pre-blending, are added to the wet perlite. The entire batch is then tumbled for an additional few minutes.

Charges of the batch are weighed and compacted to the desired shape. In the examples given hereafter, brick 9 x 4½ x 2½ inches were made.

In making these brick, the prepared mix is charged to a hopper associated with a forming machine, for example, an impact press. With such a forming machine a predetermined amount, usually that calculated to result in an unburned or green density on the order of 72 lbs./cu. ft., is charged to each brick mold and the press then compacts the charge until the desired thickness has been achieved. Thereafter, the brick are dried at about 230° F. and fired for about 10 hours at 2670° F. Firing is at a temperature and for a period of time to permit the magnesite-perlite reaction to be completed.

A variety of compositions within the present invention were prepared in accordance with the foregoing procedure. The compositions used and the properties of the resulting product are set forth in the following tables.

Table I illustrates mixes of dead burned magnesite and expanded perlite. The data obtained are:

*Table I*

| | A | B | C | D |
|---|---|---|---|---|
| Dead burned seawater magnesite (percent) | 90 | 85 | 80 | 75 |
| Expanded perlite | 10 | 15 | 20 | 25 |
| Water (added) | 5 | 5 | 5 | 5 |
| Sulfite waste liquor (added) | 5 | 5 | 5 | 5 |
| Bulk density (lbs./cu. ft.) | 92 | 82 | 72 | 62 |
| Cold crushing strength (p.s.i.) | 950 | 730 | 470 | 250 |
| Linear change in burning (percent) | −1.0 | −0.7 | −0.7 | −0.4 |
| Reheat 2,910° F., 5 hour hold percent linear change | −0.6 | −0.7 | −0.5 | −0.2 |

These data demonstrate the good strength and low density of my products. The brick came from the kiln with the predicted dimensions, and required little or no dressing or sizing. In addition the marked dimensional stability and refractoriness of the brick are evident in the data on linear change, especially that after the reheat for five hours above 2900° F. It should be noted that for the intended application, a shrinkage of over about one percent is undesired; however, expansion on the order of up to about 2½ percent is entirely acceptable and may even be desirable.

In other tests, olivine was used in place of part of the dead burned magnesite. Olivine is a solid solution mineral containing forsterite ($2MgO \cdot SiO_2$) and fayalite ($2FeO \cdot SiO_2$) in varying proportions. It is chemically compatible with magnesia and with the silica of the perlite. The following is a typical analysis, in weight percent, of olivine:

| | Percent |
|---|---|
| $SiO_2$ | 39.7 |
| $Al_2O_3$ | 0.7 |
| FeO | 9.1 |
| $Cr_2O_3$ | 1.0 |
| CaO | 0.3 |
| MgO | 46.6 |
| Loss | 2.5 |

Several compositions of olivine and dead burned magnesite were used. The data obtained are:

Table II

| | F | G | H |
|---|---|---|---|
| Dead burned Nevada magnesite | 60 | 40 | 20 |
| Olivine (−65 mesh) | 20 | 40 | 60 |
| Expaned perlite | 20 | 20 | 20 |
| Water (added) | 5 | 5 | 5 |
| Sulfite waste liquor (added) | 5 | 5 | 5 |
| Bulk density (lbs./cu. ft.) | 69 | 69 | |
| Cold crushing strength (p.s.i.) | 270 | 260 | |
| Linear change in burning (percent) | −0.2 | −0.1 | (¹) |
| Reheat 2910° F., 5 hour hold percent linear change | 0.0 | +0.2 | |

¹ Melted and slumped.

These data show that amounts of olivine up to about 40 percent of the total solids of the mix can be used. Beyond that, apparently the magnesia content is inadequate to provide the stable structure upon reaction with the perlite. The low density, adequate strength and high refractoriness and dimensional stability are evident in compositions F and G.

In Table III are the data obtained on compositions in which chrome ore was substituted for part of the magnesite. A typical analysis of Philippine chrome ore, one of the chrome ores available and which can be used in the invention, is as follows:

| | Percent |
|---|---|
| $SiO_2$ | 4.9 |
| $Al_2O_3$ | 29.9 |
| FeO | 12.8 |
| $Cr_2O_3$ | 32.4 |
| CaO | 0.5 |
| MgO | 17.8 |
| Loss | 0.9 |

The compositional and operating data on the chrome ore compositions are:

Table III

| | I | J | K |
|---|---|---|---|
| Dead burned sea water magnesite | 55 | 50 | 45 |
| Chrome Ore (−28 mesh) | 20 | 25 | 30 |
| Tennessee ball clay | 5 | 5 | 5 |
| Perlite | 20 | 20 | 20 |
| Water (added) | 5 | 5 | 5 |
| Sulfite waste liquor (added) | 5 | 5 | 5 |
| Bulk density (lbs./cu. ft.) | 66 | 65 | 70 |
| Cold crushing strength (p.s.i.) | 260 | 220 | 170 |
| Linear change in burning (percent) | +0.8 | +1.3 | +1.8 |
| Reheat 2,910° F., 5 hour hold percent linear change | −1.0 | −0.5 | (¹) |

¹ Shrank excessively.

Here again the low bulk density, adequate strength for handling, high refractoriness and dimensional stability are evident. In addition, the presence of chrome ore is desirable where increased resistance to spalling is desired.

In another series of tests, alumina was substituted for part of the magnesite. The analysis of Bayer process alumina, which has been found suitable for use in my invention, is:

| | Percent |
|---|---|
| $Al_2O_3$ | 99.4 |
| $SiO_2$ | 0.3 |
| $Fe_2O_3$ | 0.2 |
| Alk. earths | 0.1 |

The presence of alumina in magnesite brick is valuable in providing a stable structure through the formation of an $MgO \cdot Al_2O_3$ spinel bond. The data obtained on the alumina containing insulating brick are:

Table IV

| | L | M |
|---|---|---|
| Dead burned sea water magnesite | 60 | 40 |
| Calcined alumina (−325 mesh) | 20 | 40 |
| Expanded perlite | 20 | 20 |
| Water (added) | 5 | 5 |
| Sulfite waste liquor (added) | 5 | 5 |
| Bulk density (lbs./cu. ft.) | 68 | |
| Cold crushing strength (p.s.i.) | 570 | |
| Linear change in burning (percent) | +1.7 | (¹) |
| Reheat 2910° F., 5 hour hold percent linear change | −0.5 | |

¹ Shrank excessively.

Ternary mixtures were also tried. The data obtained on the ternary mixture of dead burned magnesite, alumina and olivine are:

Table V

| | O | P | Q |
|---|---|---|---|
| Dead burned sea water magnesite | 40 | 40 | 40 |
| Olivine (−65 mesh) | 30 | 25 | 20 |
| Calcined alumina (−325 mesh) | 10 | 15 | 20 |
| Expanded perlite | 20 | 20 | 20 |
| Sulfite waste liquor (added) | 5 | 5 | 5 |
| Water (added) | 5 | 5 | 5 |
| Bulk density (lbs./cu. ft.) | 65 | 64 | 65 |
| Cold crushing strength (p.s.i.) | 350 | 410 | 460 |
| Linear change in burning (percent) | +2.2 | +2.4 | +2.1 |
| Reheat 2,910° F., 5 hour hold percent linear change | +0.3 | +0.3 | +0.6 |

From the data found in Tables IV and V, it can be seen that moderate amounts of alumina can be substituted for dead burned magnesite. The alumina can be included even where portions of the magnesite are substituted by olivine. The same pattern of results as noted above is evident in these data. The addition of alumina to a mix containing magnesite and olivine results in a more stable structure through the combination of the forsterite and $MgO \cdot Al_2O_3$ spinel bond. The alumina also stabilizes the iron oxide that is present in the olivine. The compositions of Table V are of further importance in view of the more economical nature of the batch, for olivine is a relatively inexpensive raw material.

Analysis of a typical ball clay, which has given satisfactory results in my invention, is as follows:

| | Percent |
|---|---|
| $SiO_2$ | 53.6 |
| $Al_2O_3$ | 30.3 |
| $Fe_2O_3$ | 0.9 |
| CaO | 0.49 |
| $TiO_2$ | 1.7 |
| Alkalies | 0.41 |
| Ignition loss | 12.4 |

The data obtained in substituting clay for the part of the magnesite in producing shapes in accordance with my invention are as follows:

Table VI

|  | R | S | T |
|---|---|---|---|
| Dead burned sea water magnesite | 75 | 65 | 55 |
| Tennessee ball clay | 5 | 15 | 25 |
| Expanded perlite | 20 | 20 | 20 |
| Sulfite waste liquor (added) | 5 | 5 | 5 |
| Water (added) | 5 | 5 | 5 |
| Bulk density (lbs./cu. ft.) | 68 | 66 | 62 |
| Cold crushing strength (p.s.i.) | 520 | 410 | 580 |
| Linear change in burning (percent) | +0.3 | +1.6 | +2.0 |
| Reheat 2,910° F., 5 hour hold percent linear change | +0.3 | +0.3 | +0.6 |

The use of clay in the brick results in considerably higher strength than in those ternary mixtures in which olivine and alumina are used, thereby providing easier handling of the resultant brick. Moreover, the batches with clay are more easily worked as a consequence of the presence of the clay. However, the use of clay in amounts of more than 25 percent of the total solids brings about a condition where too little magnesia is then available to be converted to forsterite when the body is burned. Consequently, the pressed body will not retain its form upon firing.

It will be realized that ternary mixtures of dead burned magnesite, chrome ore, and olivine and of dead burned magnesite, alumina, and chrome ore are also contemplated in my invention as well as the substitution of alumina by clay in the various blends.

As is only partly clarified by foregoing statements, the batch materials are moist, but free-flowing, so they are readily charged to mold chambers of the forming machines. There are many types of compacting machines which can be used for forming the brick. The impact or vibration press has been mentioned. Hydraulic and mechanical presses of the various available types may be used. A still different type of forming machine, the sand-slinger, also accomplishes compaction in an acceptable manner.

From the foregoing discussion and data it is evident that my invention provides a unique advance in the art of basic insulating refractories. Pressed refractory insulating brick of basic compositions have not been available to industry prior to the present discovery, notwithstanding the recognized need for them and the efforts of industry to produce them. The inherent resistance to chemical attack in high temperature uses renders these brick uniquely suitable for many applications. Being pressable compositions by which the final dimensions are provided by a very economical step, the brick are further advantageous over present sizing practices now used.

In accordance with the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. A power pressable basic insulating refractory composition consisting essentially of, on a solids basis, about 15 to 25 weight percent of expanded perlite, at least one member selected from the group consisting of (a) up to 40 weight percent of olivine, (b) up to 25 weight percent of chrome ore, (c) up to 20 weight percent of alumina, and (d) up to 25 weight percent of ball clay, and the remainder dead burned magnesite, said magnesite content being at least 25 weight percent of the total solids.

2. A fired basic lightweight insulating refractory shape capable of withstanding a temperature of at least 2900° F., having a density of less than 85 pounds per cubic foot and formed from a composition in accordance with claim 1.

3. A fired basic lightweight insulating refractory shape formed of, on a solids and weight basis, 20 percent of expanded perlite and the remainder dead burned magnesite.

4. A lightweight insulating refractory shape of basic composition formed, by weight, of 15 to 25 percent of expanded perlite and the remainder substantially all dead burned magnesite.

References Cited in the file of this patent

UNITED STATES PATENTS 2,625,512    Powell    Jan. 13, 1953

FOREIGN PATENTS 307,391    Great Britain    Mar. 4, 1925